Figure 1A:
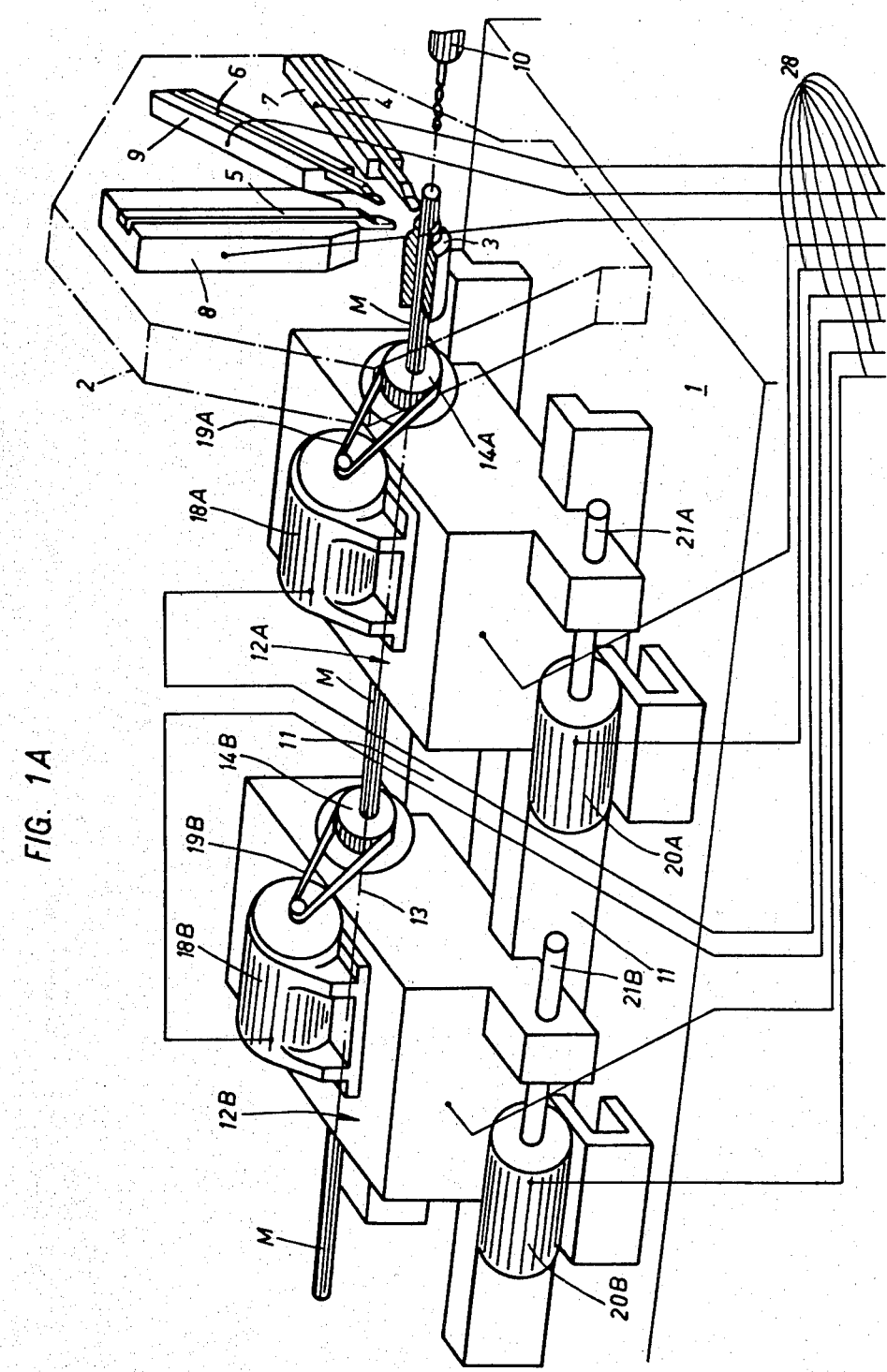

United States Patent [19]

Aeschbacher

[11] 4,366,734
[45] Jan. 4, 1983

[54] AUTOMATIC LATHE FOR THE MACHINING OF BAR MATERIAL

[75] Inventor: Gottfried Aeschbacher, Delémont, Switzerland

[73] Assignee: Tornos S.A., Fabrique de Machine Moutier, Moutier, Switzerland

[21] Appl. No.: 209,405

[22] PCT Filed: May 31, 1979

[86] PCT No.: PCT/CH79/00080
  § 371 Date: Oct. 1, 1980
  § 102(e) Date: Oct. 1, 1980

[87] PCT Pub. No.: WO80/01660
  PCT Pub. Date: Aug. 21, 1980

[30] Foreign Application Priority Data

Feb. 8, 1979 [CH] Switzerland ............... 1248/79

[51] Int. Cl.³ .............................................. B23B 13/02
[52] U.S. Cl. .................................................. 82/2.5
[58] Field of Search .................... 82/2.5, 2.7, 20

[56] References Cited

U.S. PATENT DOCUMENTS 2,376,476 5/1945 Chatelain ........................... 82/2.5
2,389,556 11/1945 Siegerist ............................. 82/20

FOREIGN PATENT DOCUMENTS 726276 8/1942 Fed. Rep. of Germany .
2531430 2/1976 Fed. Rep. of Germany .
2284400 4/1976 France .
608399 1/1979 Switzerland .

*Primary Examiner*—Leonidas Vlachos
*Attorney, Agent, or Firm*—Kenyon & Kenyon

[57] ABSTRACT

Instead of a single headstock, two headstocks (12A,12B) are assembled one behind the other. Their spindles (14A,14B) have the same lengthaxis. The movements of the headstocks in the direction of that axis and for the opening and closing of their corresponding collets are controlled in such a way that while one of the headstock advances the material bar (M) with closed collet, the second headstock returns to its start position with open collet. During the transition phases both collets are closed. The main advantages are: the separate material feeding system is no more necessary and the dead times required for returning the headstock are suppressed.

1 Claim, 7 Drawing Figures

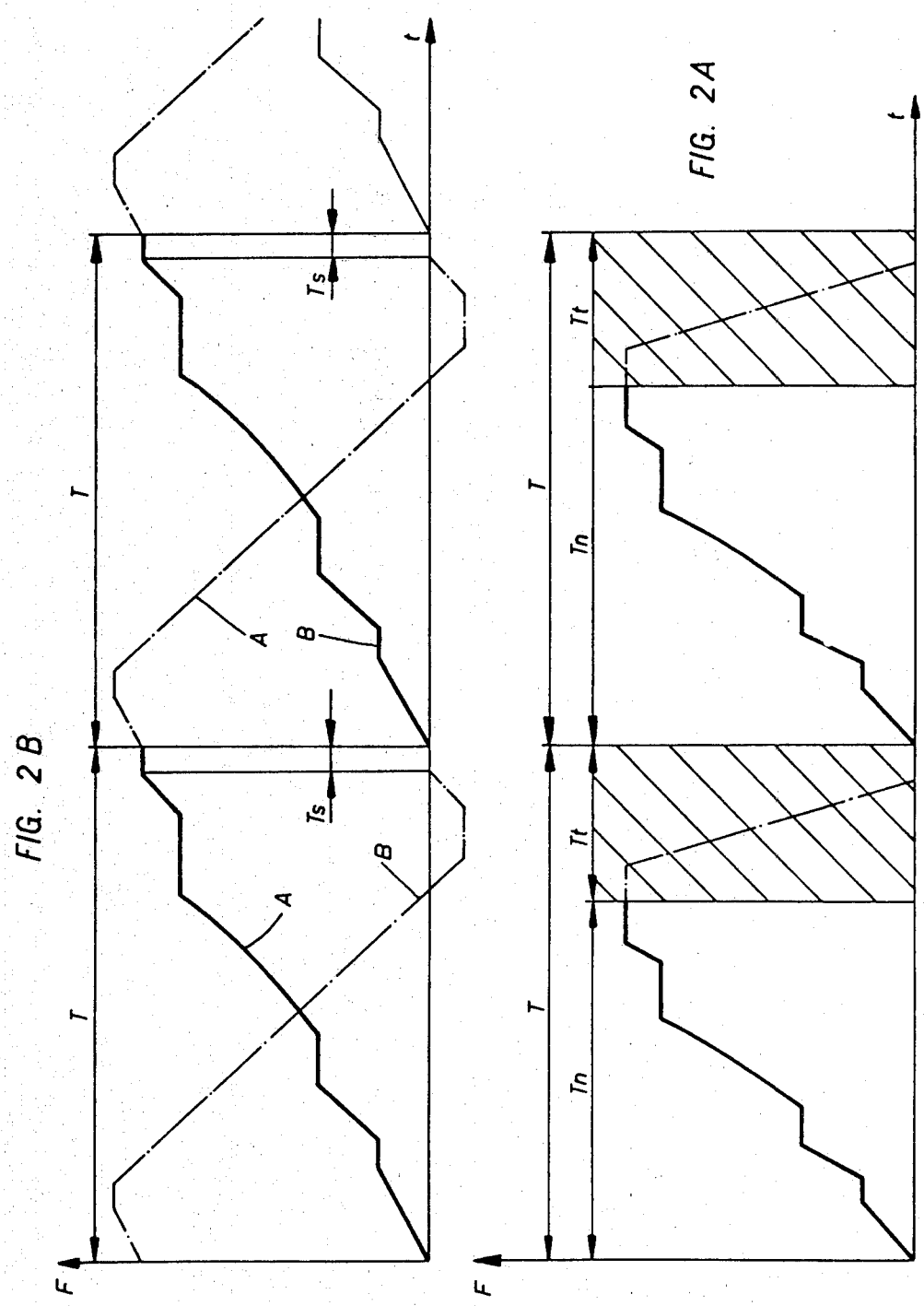

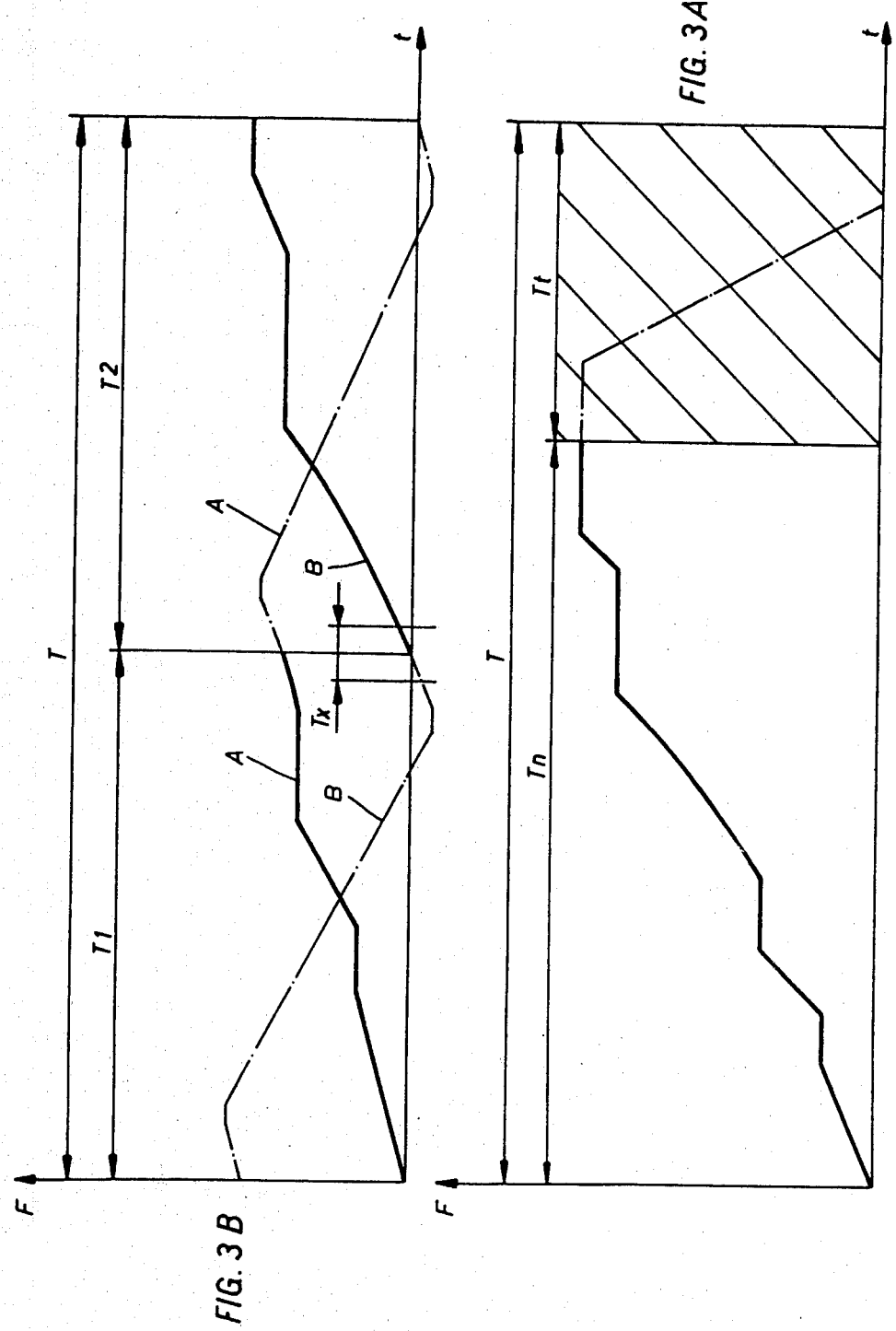

AUTOMATIC LATHE FOR THE MACHINING OF BAR MATERIAL

The invention concerns an automatic lathe machining bar material, fitted with a fixed steady with material guide-bush assembled on the machine-bed, provided on its front side with radially guided tools and on the back side a headstock guided in the length direction, the spindle in the headstock being motor driven and fitted with a collet and means to open and to close it, means being provided to coordinate the control and execution of tool movements, headstock and collet motions, permitting to produce automatically workpieces out of the material bar to be machined in successive and similar sequences of operations.

Such automatic lathes are used since many years in very different designs. From the fact that all of them are fitted only with a single headstock, through which the bar to machine is passing, important disadvantages can be deduced. The first disadvantage, mainly when rather longer workpieces are manufactured, consists in the necessity to reserve a last part of the machining cycle, during which no tool is working and during which the material bar must be kept axially stopped, for the return of headstock from its most forward position to its most backward position. The required dead-time for this purpose may easily take 25% of the total machining cycle.

A second important disadvantage consists in the necessity to provide a costly bar feeding system, which must also be able to extract or take back the bar end-bit. This system requires moreover some special design of the material guide behind the headstock and of the main spindle itself, which influences negatively the correct radial seat of the material bar, resulting in the impossibility to run the machine at the high spindle speeds or cutting feeds which otherwise could be possible thanks to the high quality of the tools available today.

The invention intends to provide a design for automatic lathes of the above mentioned type, permitting to overcome these disadvantages. The solution of this problem, according to the invention, has been found by the presence on the machine-bed, behind said first headstock (12A) of a second headstock (12B), which can also be moved lengthwise and the spindle of which is revolving around the same axis as that of the first headstock and is also fitted with a collet and means to open and to close same, and that said device influences also the second headstock and its means to open and to close its collet, so that whilst a first workpiece is machined or partially machined from the material bar in the spindle of the first headstock thanks to the gradual advance of that headstock from its starting position, the second headstock is being returned to its start position and that now a second workpiece is being machined or partially machined out of the material bar in the spindle of the second headstock while it advances gradually and whilst the first headstock is returned to its starting position, whereas during the transition phases the material bar is clamped in the first and also in the second headstock spindle.

It is obvious that with such a design the first disadvantage mentioned above is eliminated, because one of the two headstocks (with opened proper collet) can always be returned to its start position while the other headstock and its collet are working. The effective work of the two headstocks can be conjugated practically without gasp.

During the whole machining time, the material bar is never released by both collets at the same time. The result is that the combination of the two headstocks and collets can assume the feeding of the material bar in lieu of the bar feeding system that was indispensable till now, including the ejection of the bar end-bit, pushed by the following material bar. If the bar feeding system is suppressed, the bar guide at the rear end of the machine can be designed in an optimal but considerably simplified manner to cope with its function. This again makes possible to reduce considerably the noise and to increase notably the number of revolutions. As to this last point, the possibility is given to design the spindles (and their collet), over a good portion of their length for a perfect guiding of the bar.

Figure 1B:
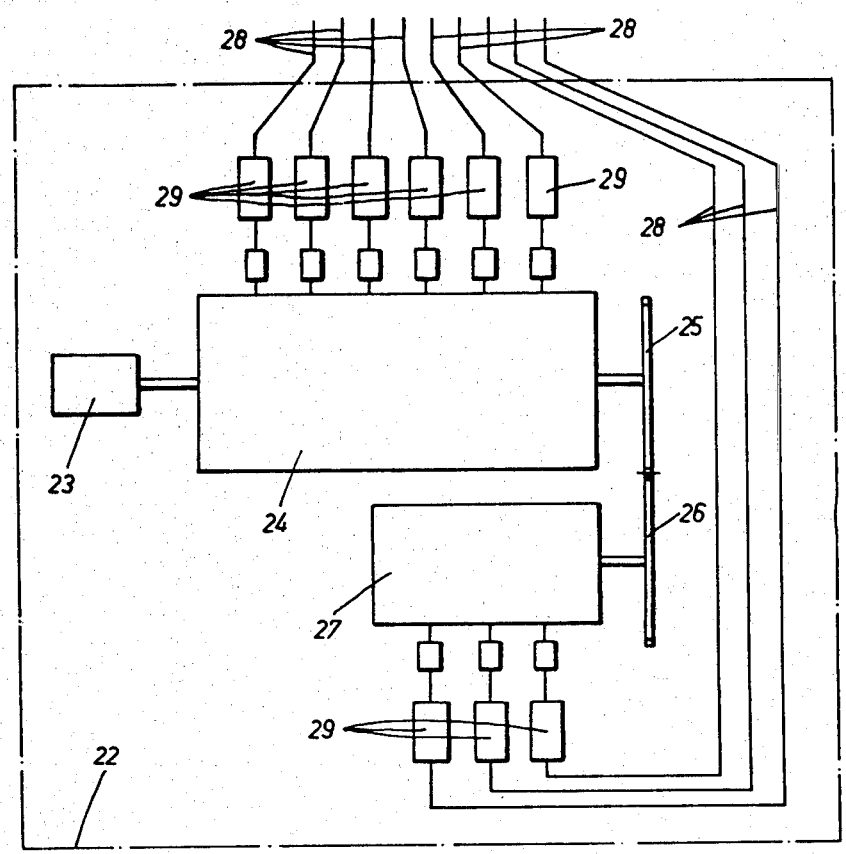
Figure 1C:
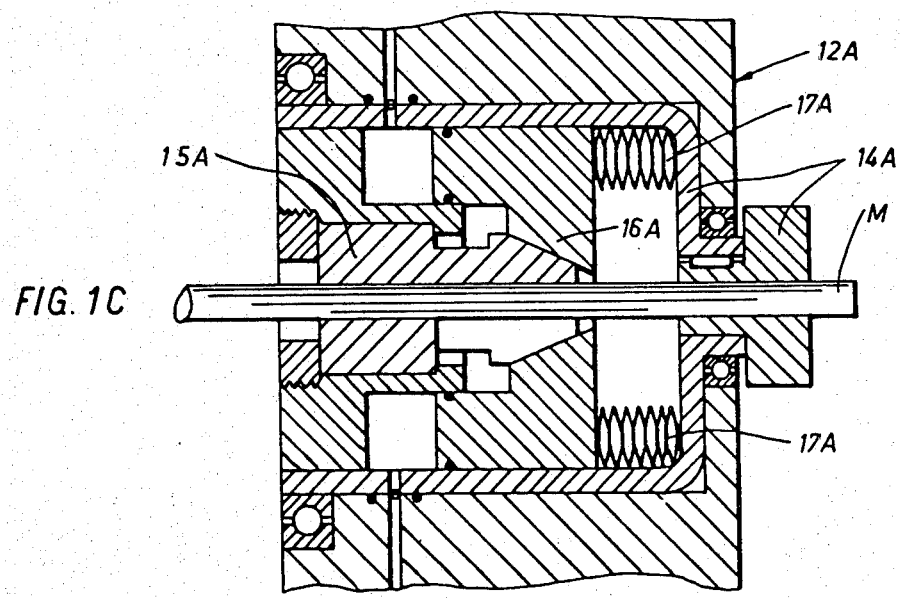

The invention is explained hereafter by means of enclosed drawings. They show:

FIG. 1A: a schematic perspective view with partial section of one of the headstocks FIG. 1B: a very simplified schema of the corresponding drive FIG. 1C: a schematic length section of one of the headstocks FIGS. 2A and 2B: time diagrams of the material resp. headstock feeds F, which will be effected when machining successively two similar workpieces during the cycle time T. FIG. 2A corresponds to the known designs and FIG. 2B to the design according to the invention FIGS. 3A and 3B: time diagrams of the material resp. headstock feeds F, which will be effected when machining another workpiece during the cycle time T.

It is pointed out that for the constructive design of the automatic and for its drive all kinds of possibilities are open. This will be considered as self-explanatory by experts in the matter.

It is noted by the way that the drive is not only foreseen for the headstock advance, resp. material feed F, but also for the radial movements of the cutting tools or other eventual tools and for the opening and closing of the clamping collet, (a) in the classical way, by means of cams located on one or several camshafts, controlling the driven parts by only mechanical means, like levers, pistons and similar elements, or (b) as shown in a very simplified way by FIG. 1B: by means of a control device, that comprises a classical control drum with changeable and adjustable toes or similar means, actuating through electrical, hydraulic or penumatic circuits with switches, connectors, valves, solenoids, pistons, etc., (c) by numeric (NC-) or computer-aided numeric control (CNC-), as already done for turning lathes and other machine-tools. As a single example for such a control of the headstock movement and of the motion of the tool-slides, see CH-PS No. 584.575 and the corresponding FR-OS No. 2.275.267

As the construction details are in no way important, the FIGS. 1A, 1B and 1C show a much simplified schematic design. On the machine-bed 1 of the automatic lathe, a fixed steady 2 with a material guide-bush 3 has been assembled.

A set of tools (cutting tools) is mounted on its front side, for instance in a fan-shaped order, like 4,5,6, together with their slides 7,8, resp. 9 (and their driving means) the guides of which may be located at the steady 2 for instance. An auxiliary attachment 10 for axial or cross drilling operations or for milling or other second operations can be foreseen as usual.

Behind the steady 2, the machine-bed 1 is fitted with length-slides 11, guiding two headstocks 12A, 12B placed one after the other at a certain distance—instead of the single headstock as before—these headstocks moving in the direction of the main-axis 13 of the automatic and of the material bar M which is being machined.

The parts corresponding to these headstocks have been marked by reference signs, to which the letters A or B have been added.

In the section of the headstock 12A the spindle 14A can be seen. This spindle is revolving on fixed bearings. The section shows also a partially slitted clamping collet 15A with its conical external shape and the opening and closing system 16A, moveable within the spindle. (This element has been shown as a ringed piston, moving from the left to the right thanks to oil or air-pressure against the resistance of a pile of spring-plates 17A, for the opening and closing of the collet 15A).

Each headstock 12A and 12B has an electrical spindle drive motor 18A, resp. 18B. These motors may be similar or different, for instance with adjustable number of revolutions, or as braking or stopping motors, or as stepping motors. Also mechanical or electrical means may be foreseen to grant—at least partially—their synchronisation.

As drive connection for each motor 18A, 18B to its spindle 14A, 14B a belt system 19A resp. 19B has been foreseen. To obtain the length motion of each of the headstocks, a linear motor 20A, 20B has been added, located on the machine-bed 1, the threaded spindle 21A resp. 21B of which is meshing with a lateral eye of the corresponding spindle (see also CH-PS No. 584.575). As already mentionned, any other adequate means could be considered.

The representation of the control device 22, FIG. 1B (for instance a separate console) is very simplified. It is supposed that a stepping motor 21 drives a first control drum 24 and thanks to a pair of gears 25, 26 a second control drum 27 with a transmission ratio of 1:1 or 1:2 whereas the toes of the drums can be adjusted on the contour and in their length. They actuate contacts of the drive connections 28, in which electric connectors, electric valves, etc. are assembled, according to the requirements, as shown with 29.

The FIGS. 2A, 2B, 3A, 3B will show the main difference of the working method as per the invention design with two headstocks, compared with the classical single headstock. As per FIGS. 2A and 2B, two similar workpieces are being machined, in two successive cycles requiring a time period T. When machining with only one headstock (FIG. 2A) the headstock advance and the material feed F must be effected during the useful time $T_n$, because the return of the headstock to its starting position (with open collet) requires a dead-time $T_t$.

With two headstocks (with their cam-sets A and B) FIG. 2B, the useful time corresponds now always to the full cycle time, because during the first cycle the material bar M is advanced by the headstock 12A (whilst the headstock 12B returns to its start position). During the second cycle, the bar M is similarly advanced by the headstock 12B (whilst the headstock 12A returns to its start position). Note that for a short period of time $T_s$ at the end of each cycle (whilst preferably both headstocks are not moving) the material bar M is clamped in both headstocks, so that—as already mentionned—the combination of the two headstocks may replace the bar feeding system and avoid the first feed "against a stop".

According to the FIGS. 3A and 3B, the workpiece is being machined during the time period T of the cycle. If only one headstock is used (FIG. 3A) only the useful time $T_n$ is available for the proper machining and for the return of the headstock (with open collet) a dead time $T_t$ must be reserved. With two headstocks however, the headstock 12A effects the material feed during the cycle time $T_1$ (whilst the headstock 12B is returned to its start position). The headstock 12B effects the feed during the cycle time $T_2$ ($T_2$ may be equal to or different of $T_1$) (whilst the headstock 12A is returned to its start position). During the transition phases taking place during the short time period $T_x$, the material bar is also clamped by both headstocks.

The difference with the working method as per FIG. 2B consists in fact only in the similar advance cams for the two headstocks, whilst here the advance cams are different. (This is also the case for the advance cams of the tools). The working method as per FIG. 3B is very advantageous for longer workpieces, because the material advance required may be shared by the two headstocks. If the headstock advances are controlled by cams, the necessary number of rises for the length of the workpiece can also be shared by the two cams.

The steepness of the rises on the cam segments—in both working cases—can be reduced, mainly the steepness of that part or parts of the cams, which controls the headstock return.

I claim:

1. Automatic lathe for machining bar material, fitted with a fixed steady with material bar guide-bush assembled on the machine-bed, provided on its front side with radially guided tools and on the back side with a headstock guided in the length direction, the spindle in the headstock being motor driven and fitted with a collet and means to open and to close it, means being also provided to corrdinate the control and execution of tool movements, headstock and collet motions, permitting to produce automatically workpieces out of the material bar to be machined in successive and similar sequences of operations, characterized by the presence on the machine-bed, behind said first headstock (12A) of a second headstock (12B) having a spindle, means for moving said headstock lengthwise, means for driving the spindle of which is revolving around the same axis as that of the first headstock and is also fitted with a collet and means to open and to close same, and additional control means which coordinates and controls the second headstock and its means to open and to close its collet, in concert with said first headstock so that whilst a first workpiece is machined or partially machined from the material bar in the spindle of the first headstock thanks to the gradual advance of that headstock from its starting position, the second headstock is being returned to its start position and that now a second workpiece is being machined or partially machined out of the same material bar in the spindle of the second headstock while it advances gradually and whilst the first headstock is returned to its starting position, whereas during the transition phases the material bar is clamped in the first and also in the second headstock spindle.

* * * * *